United States Patent Office 3,154,807
Patented Nov. 3, 1964

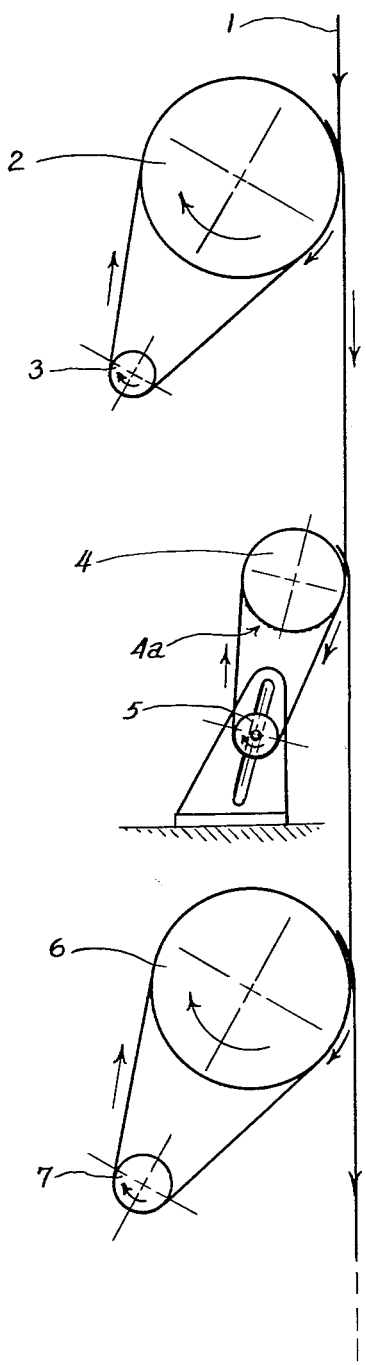
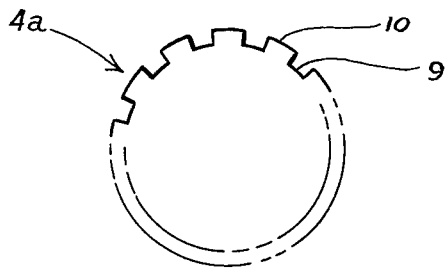
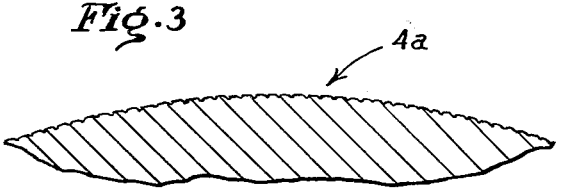
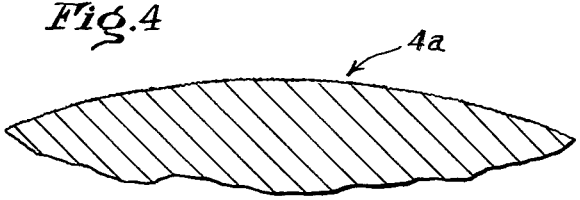

3,154,807
APPARATUS AND PROCESS FOR STRETCHING TEXTILE THREADS OF SYNTHETIC LINEAR POLYAMIDES
Kurt Müller, Domat, Ems, and Max Armin Tissi, Ittigen, Bern, Switzerland, assignors to Inventa A.G. fuer Forschung und Patentverwertung, Zurich, Switzerland
Filed Oct. 18, 1961, Ser. No. 145,819
Claims priority, application Switzerland Oct. 21, 1960
7 Claims. (Cl. 18—1)

This invention relates to an apparatus for continuous cold stretching and subsequent hot stretching of polyamide threads in one continuous working operation and to the production of textile threads of this kind of highest quality and great strength.

It is a known fact that threads of synthetic linear polyamides spun from the melt have to be stretched for industrial use to several times their original length.

The individual polyamide molecules are oriented substantially parallel to one another by the stretching whereby the chemical and physical properties of the threads are improved. Any unstretched thread has an extension of about 400% which by a cold stretching (stretching without supply of heat) is reduced to 20–30%. If during the stretching process the thread is heated by supply of heat, considerably lower extensions (e.g. 15%) and higher values and strength are obtained.

For certain purposes, for example when the polyamide threads are to be used as cord silk, efforts may have been made to keep the extension lower, i.e. approximately between 10–15%. Such material of lesser extension possesses high strength and generally is made from a thread which first had been cold stretched, but mainly is hot stretched, whereby the highest possible degree of stretch, i.e., a stretch ratio of 1:5 or more (unstretched thread:stretched thread) is of advantage.

The properties of the stretched threads obtained in this manner depend not only on the total degree of stretching but also on the ratio of the cold stretching to the hot stretching. In a discontinuous operation there are no particular difficulties in obtaining particular ratios. However, for economical and technical reasons a continuous operation is preferred, i.e., cold stretching, hot stretching and, if necessary, twisting, is carried out in a single operation on the same machine.

In a continuous process, however, threads of maximum quality can only be obtained if the apparatus used enable the stretching ratios (hot:cold) to be considerably varied or allow fixing of a suitable ratio.

Apparatus enabling a stretching process of this kind comprising two stretching devices arranged in a row, the latter being provided with a heating device in order to carry out a continuous stretching process for monofilaments (cold preliminary stretching with hot after-stretching) are known.

In a machine of this kind an unstretched monofilament is drawn into the device through a trio, i.e. a combination of three parallel rollers, and is cold stretched by a following trio running at higher speed. Thereafter, the monofilament passes over a heating rail or through a tubular heating body to the third trio, the speed of which is again greater than that of the preceding rollers so that hot after-stretching takes place.

It is the object of the present invention to provide an apparatus for carrying out a simplified process for combined preliminary and after-stretching of polyamide threads.

It has been found that threads of synthetic linear polyamides can be stretched continuously in a single operation when a non-rotating cylinder is provided having an uneven surface and serving simultaneously as heater and brake. This cylinder over which the threads travel is positioned between two conveyers for the threads, the first of which is a lead-in, and the second, rotating at a faster speed, serves as a stretcher and take-off.

Depending on the periphery of the heating cylinder and the number of turns around it, i.e., the length over which the thread slides on the heating cylinder, and on the surface finish of the cylinder, the thread is braked to a greater or lesser extent, i.e. the ratio of cold stretching to hot stretching can be adjusted as desired by altering the supporting area of the thread and the surface finish of the cylinder. This is important for obtaining definite properties of the thread (extension, breaking strength etc.).

When the braking action on the cylinder is slight, the proportion of the cold stretch to the total stretch is greater. When the braking of the thread is increased, this proportion is smaller and the proportion of hot stretch increases.

The size of the supporting area depends in addition to the angle in which the thread is wound around the cylinder. It is also dependent on the diameter of the cylinder and the position of the laterally-arranged thread guiding cylinder which affects the angle in which the thread is wound around the cylinder.

In order to obtain the desired temperature the thread must remain in contact with the cylinder for a definite time, i.e. must have a definite length in contact at a predetermined stretching speed. On the other hand, the friction of the thread against the cylinder must amount to a definite value. The combination of these two conditions determines the coefficient of friction of the thread sliding on the cylinder. The coefficient of friction is a function of the surface character of the cylinder. The more highly polished the surface, the greater the coefficient of friction. It has been found by experiment that cylinders having ground, polished surfaces cannot be used for the purpose described. If, however, the cylinder is matte chromium plated or roughened by sand blasting and then polished the surface becomes pitted and the threads slide more easily.

The frictional resistance of the thread on the cylinder and thereby the ratio of the cold stretch to the hot stretch can be determined by suitable choice of the surface character.

Similar results were also obtained by using heated grooved cylinders. The friction of the thread on the cylinder is, in this case, determined by the ratio of the breadth of the grooves to the width of the elevations between them.

When an apparatus in accordance with the invention is used, it has also been found that the hot cylinders with a pitted surface, have in addition to their function as thread brakes, the further advantage that they enable very good heating of the thread which is effected with small expenditure of thermal energy.

The above and other objects, features and advantages of the present invention will become apparent from the accompanying drawings, but it should be understood that they are given by way of illustration and not of limitation and that changes may be made without departing from the spirit and the scope of the invention as hereinafter claimed.

In the drawings,

FIG. 1 is a schematic of the device according to the invention;

FIG. 2 is one embodiment of the surface of a heating cylinder as indicated by an arrow in FIG. 1;

FIG. 3 is another embodiment of such a surface;

FIG. 4 is still another embodiment of such a surface.

Referring now to these drawings, it is shown in FIG. 1 that the unstretched thread 1 runs on to a rotating lead-in roller 2 with which a deflecting roller is associated. The thread passes three to four times around the roller 2 and the deflecting roller 3, and runs through a cold stretching zone to the stationary heating cylinder 4 which has an uneven surface 4a, the details of which are shown in FIGS. 2–4. A thread guiding roller 5 is arranged below the heating cylinder 4 and can be adjusted relative thereto by adjusting means 8. The thread is guided in two or three turns around this combined aggregate (stationary heating cylinder and rotatable guide roller). The thread now passes between the stationary heating cylinder 4 and the rotating roller 6, the hot stretching zone. A thread guide roller 7 is associated, as usual, with the roller 6. The thread is wound several times around the roller 6 and the deflecting roller 7. The total stretch ratio is determined by the ratio of the speed of revolution or the peripheral speed between the draw-off roller 6 and the lead-in roller 2.

Guide roller 5 around which the thread is wound serves to avoid contact of the thread with the entire periphery of the heating roller.

FIG. 2 shows a fluted surface on cylinder 4, as shown by 4a and the arrow in FIG. 1 having indentions 9 alternating with raised surfaces 10.

FIG. 3 is an illustration of surface 4a, as shown in FIG. 1, obtained by sandblasting and thus pitted.

FIG. 4 illustrates the surface 4a obtained by matte chromium plating.

Example 1

A yarn of poly-ε-caprolactam with a titer of 4284 den. in the unstretched condition and 100 threads which has been spun in the usual manner is passed in four turns around the lead-in roller 2 and the guide roller 3. The peripheral speed of the lead-in roller 2 amounts to 29.5 meters per minute. A cold stretch of 1:3.0 takes place in the cold stretching zone between the lead-in roller 2 and the stationary electrically heated cylinder 4, the surface of which is pitted due to sand blasting and subsequent polishing. The thread is wound twice around the stationary heating cylinder 4 and the guide roller 5. The heating roller has a diameter of 53 mm. and a surface temperature of 115° C. In the following hot stretching zone between the stationary heating cylinder 4 and the draw-off roller 6 a stretch of 1:1.7 takes place. The thread passes five times around the draw-off roller 6 which rotates with a peripheral speed of 150 meters per minute. The total stretch ratio amounts to 1:5.1. After the described stretching process the thread has an extension of 14.5%, a breaking resistance of 7.8 grams per denier and a titer of 840/100.

Example 2

A yarn of poly-ε-caprolactam with a titer of 2048 den. in the unstretched condition and 50 threads which has been spun in the usual manner is passed in four turns around the lead-in roller 2 and the guide roller 3. The peripheral speed of the lead-in roller 2 is 29.5 meters per minute. A cold stretching of 1:2.8 takes place in the cold stretching zone between the lead-in roller 2 and the stationary electrically heated cylinder 4, which has a pitted surface due to matte chromium plating. The thread passes three times around the heating cylinder 4 and the guide roller 5. The heating cylinder has a diameter of 33 mm. and a surface temperature of 115° C. A stretch of 1:1.75 takes place in a following hot stretching zone between the stationary heating cylinder 4 and the draw-off roller 6. The thread passes five times around the draw-off roller 6 which rotates with a peripheral speed of 150 meters per minute. The total stretch ratio amounts to 1:4.9. After the described stretching process the thread has an extension of 15%, a breaking resistance of 7.6 grams per denier and a titer of 420.

We claim as our invention:

1. An apparatus for cold stretching and subsequent hot stretching of threads of synthetic linear polyamides in a single continuous working operation for the production of threads of high quality and considerable strength, which comprises, in combination, two conveyor devices for the threads consisting of rotating rollers, the first acting as the lead-in device, and the second, rotating at higher speed, acting as the stretching and draw-off device; a non-rotating cylinder arranged between said two conveyor devices acting simultaneously as a heating and breaking device over which the thread is guided, said non-rotating cylinder having an uneven surface finish; a guide roll arranged parallel to the heating roller for guiding the thread in a manner to forestall contact with the entire periphery; and means for adjusting said guide roll relative to the heating roller.

2. An apparatus as defined in claim 1 wherein the heating and braking cylinder is provided with an uneven surface finish by sand-blasting and subsequent polishing.

3. An apparatus as defined in claim 1 wherein the heating and braking cylinder is provided with an uneven surface finish by matte chromium plating.

4. An apparatus as defined in claim 1 wherein the uneven surface of the heating and braking cylinder is fluted parallel to its axis.

5. An apparatus for cold stretching and subsequent hot stretching of threads of synthetic linear polyamides in a single continuous working operation for the production of threads of high quality and considerable strength, which comprises, in combination, a first conveyor serving as lead-in for said threads and consisting of rotating rollers; a non-rotating cylinder having a pitted surface and acting simultaneously as heater and brake for said threads which are guided thereover; means for heating the surface of said cylinder at substantially 115° C.; a guide roll arranged parallel to said cylinder for guiding said threads in a manner so as to forestall their contact with the entire periphery of said cylinder; means for adjusting said guide roll relative to said cylinder; and a second conveyor consisting of rotating rollers and acting as stretcher and draw-off for said threads; said first and said second conveyors rotating at different peripheral speeds so as to effect a cold stretch between said first conveyor and said cylinder of a ratio of substantially 1:2.8–3; and a hot stretch between said cylinder and said second conveyor of substantially 1:1.7–1.75.

6. An apparatus for cold stretching and subsequent hot stretching of threads of synthetic linear polyamides in a single continuous working operation for the production of threads of high quality and considerable strength, which comprises, in combination, a first conveyor serving as a lead-in for said threads and consisting of rotating rollers; a non-rotating cylinder having a pitted surface and acting simultaneously as heater and brake for said threads which are guided thereover; means for heating the surface of said cylinder at substantially 115° C.; a guide roll arranged parallel to said cylinder for guiding said threads in a manner so as to forestall their contact with the entire periphery of said cylinder; means for adjusting said guide roll relative to said cylinder; and a second conveyor consisting of rotating rollers and acting as stretcher and draw-off for said threads; said second conveyor rotating at substantially 5 times the peripheral speed of said first conveyor thereby imparting to said threads a cold stretch between said first conveyor and said cylinder of substantially 1:2.8–3; and a hot stretch between said cylinder and said second conveyor of substantially 1:1.7–1.75.

7. An apparatus for cold stretching and subsequent hot stretching of threads of synthetic linear polyamides in a single continuous working operation for the production of threads of high quality and considerable strength, which comprises, in combination, a first conveyor serving as a lead-in for said threads and consisting of rotating rollers; a non-rotating cylinder having a pitted surface and acting simultaneously as heater and brake for said threads which are guided thereover; means for heating the surface of said cylinder at substantially 115° C.; a guide roll arranged parallel to said cylinder for guiding said threads in a manner so as to forestall their contact with the entire periphery of said cylinder; means for adjusting said guide roll relative to said cylinder; and a second conveyor consisting of rotating rollers and acting as stretcher and draw-off for said threads; said first conveyor rotating at substantially a peripheral speed of 30 meters per minute; and said second conveyor at substantially 150 meters per minute.

References Cited in the file of this patent

UNITED STATES PATENTS

| | | |
|---|---|---|
| 2,289,232 | Babcock | July 7, 1942 |
| 2,956,330 | Pitzl | Oct. 18, 1960 |
| 2,993,269 | Boerma et al. | July 25, 1961 |
| 3,009,231 | Kleekammetal | Nov. 21, 1961 |

FOREIGN PATENTS

| | | |
|---|---|---|
| 591,604 | Canada | Jan. 26, 1960 |
| 597,765 | Canada | May 10, 1960 |